US010145431B2

(12) United States Patent
Hofschulte et al.

(10) Patent No.: US 10,145,431 B2
(45) Date of Patent: Dec. 4, 2018

(54) PARKING BREAK

(71) Applicant: IMS Gear SE & Co. KGaA, Donaueschingen (DE)

(72) Inventors: Wolfram Hofschulte, Bonndorf (DE); Jens Fechler, Huefingen (DE); Ronny Goepfert, Oederan (DE); Roland Michel, Chemnitz (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 114 days.

(21) Appl. No.: 15/397,108

(22) Filed: Jan. 3, 2017

(65) Prior Publication Data

US 2017/0191537 A1    Jul. 6, 2017

(30) Foreign Application Priority Data

Jan. 4, 2016    (EP) .................................... 16150091

(51) Int. Cl.
*F16D 55/08* (2006.01)
*F16D 65/18* (2006.01)
(Continued)

(52) U.S. Cl.
CPC ............ *F16D 65/18* (2013.01); *B60T 13/741* (2013.01); *F16D 55/226* (2013.01);
(Continued)

(58) Field of Classification Search
CPC ............. F16D 2127/06; F16D 2125/64; F16D 2125/645; F16D 2125/66; F16D 2125/68
See application file for complete search history.

(56) References Cited

U.S. PATENT DOCUMENTS 6,305,506 B1    10/2001  Shirai et al.
6,412,608 B1 *   7/2002  Mohr ...................... F16D 65/14
                                                  188/156
(Continued)

FOREIGN PATENT DOCUMENTS

DE      102012020765 A1     4/2014
EP          2532915 A1     12/2012
(Continued)

OTHER PUBLICATIONS

Extended Search Report dated Jun. 22, 2016 in EP Application No. 16150091.3.
(Continued)

*Primary Examiner* — Nicholas J Lane
(74) *Attorney, Agent, or Firm* — Panitch Schwarze Belisario & Nadel LLP

(57) ABSTRACT

A parking brake, particularly for a vehicle, includes a brake piston, supported to be movable along a longitudinal axis between a braking position and an open position, by which a brake disk is immobilizable by applying a braking force, when the brake piston is in the braking position, a drive unit for moving the brake piston along the longitudinal axis, and a toggle lever interacting with the brake piston and having at least first and second legs. The first and second legs are connected rotatably with a joint element and are actuatable by the drive unit, such that the toggle lever provides the braking force and applies it to the brake piston. An immobilizing device having such a parking brake, as well as a vehicle having the immobilizing device, and a method for immobilizing a vehicle by such an immobilizing device are also provided.

11 Claims, 3 Drawing Sheets

(51) Int. Cl.
    *B60T 13/74*         (2006.01)
    *F16D 55/226*      (2006.01)
    *F16D 125/66*      (2012.01)
    *F16D 121/24*      (2012.01)
    *F16D 125/40*      (2012.01)
    *F16D 125/64*      (2012.01)

(52) U.S. Cl.
    CPC ........ *F16D 65/183* (2013.01); *F16D 2121/24* (2013.01); *F16D 2125/40* (2013.01); *F16D 2125/64* (2013.01); *F16D 2125/66* (2013.01)

(56) References Cited

U.S. PATENT DOCUMENTS

| | | | |
|---|---|---|---|
| 6,502,671 B2 * | 1/2003 | Hayford | F16D 65/18 188/72.7 |
| 6,997,291 B2 | 2/2006 | Boisseau | |
| 2001/0013450 A1 * | 8/2001 | Mohr | B60T 13/148 188/106 F |

FOREIGN PATENT DOCUMENTS

| | | | |
|---|---|---|---|
| JP | 2004530853 A | 10/2004 |
| KR | 20110002550 A | 1/2011 |
| KR | 20110125112 A | 11/2011 |

OTHER PUBLICATIONS

Office Action dated Apr. 6, 2018 in KR Application No. 10-2017-0000373.

\* cited by examiner

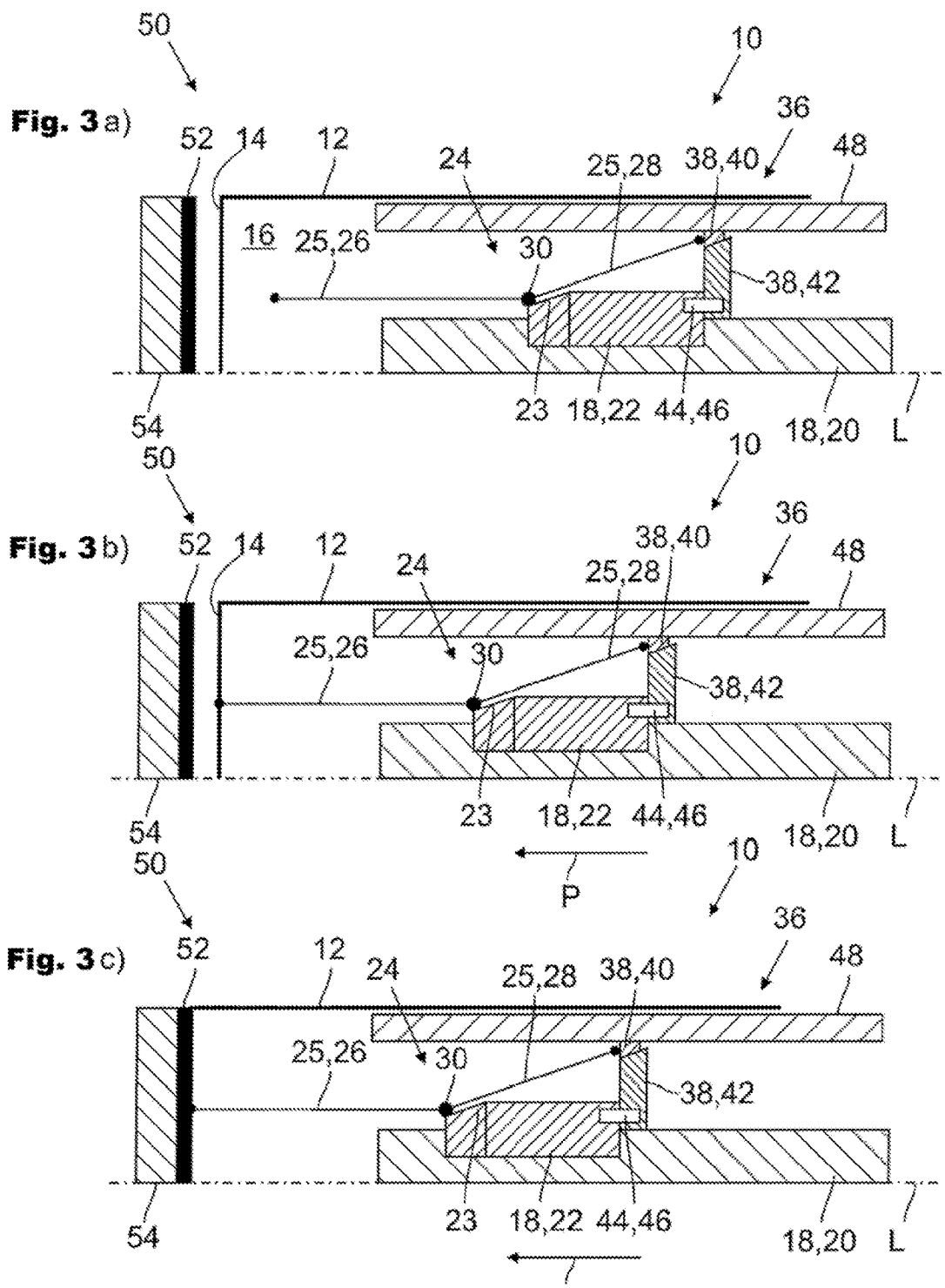

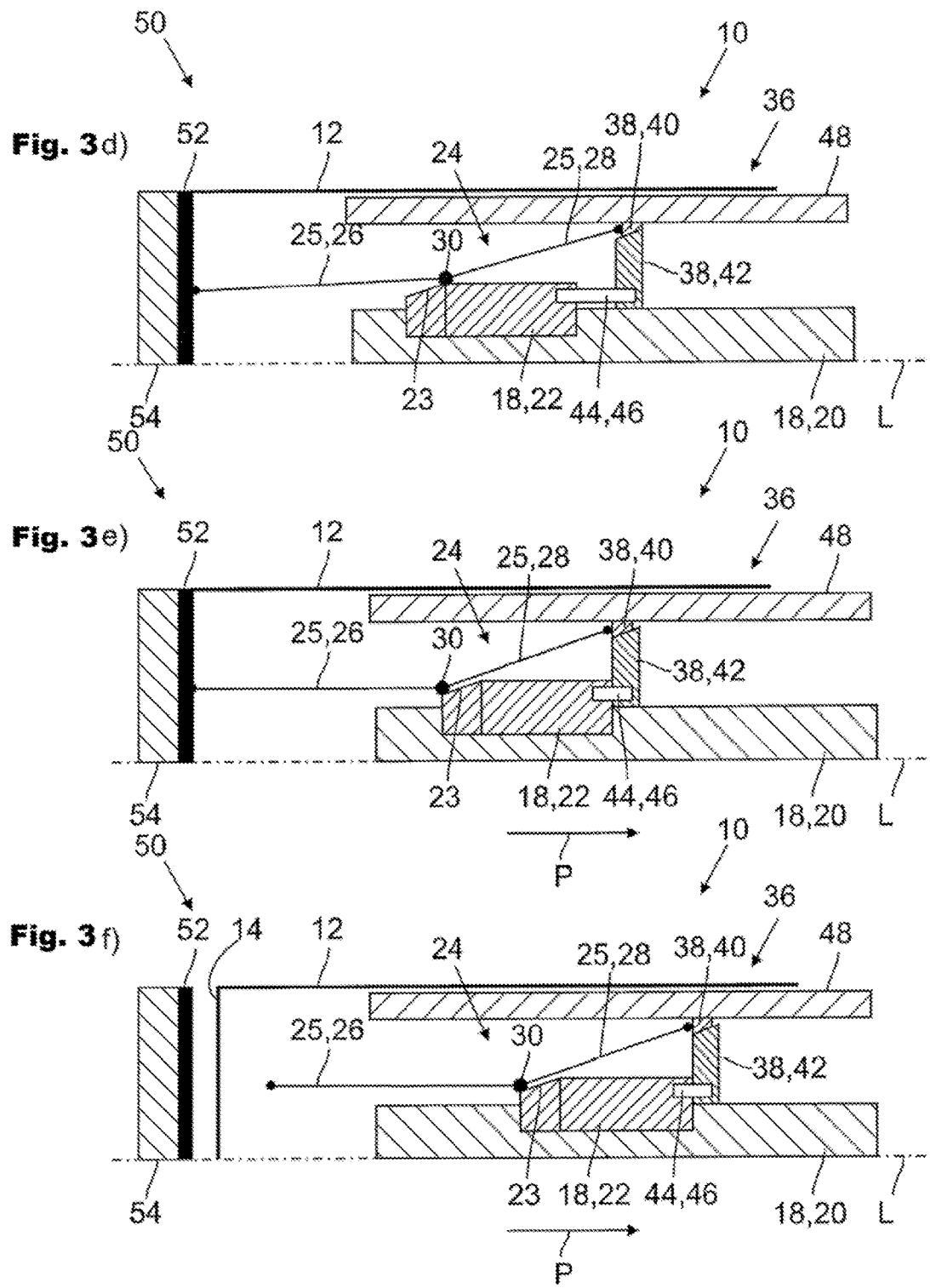

PARKING BREAK

BACKGROUND OF THE INVENTION

The present invention relates to a parking brake, in particular for a vehicle. The invention further relates to an immobilizing device, in particular for immobilizing a vehicle that has such a parking brake. In addition, the invention relates to a vehicle having a corresponding immobilizing device and to a method for immobilizing a vehicle.

Parking brakes are brakes that steadily block the wheels, in particular of a vehicle or an aircraft, when the vehicle or aircraft is at a standstill. Because the parking brake presented here is used mainly for vehicles, the following statements refer to vehicles. The parking brake is independent of the actual braking system of the vehicle and prevents the parked vehicle from beginning to roll in an uncontrolled way.

The parking brakes of vehicles are constructed in many cases as cable brakes with a hand or foot lever. In recent times, parking brakes have featured electrical drive motors which, depending on the construction, interact with the cable brakes and replace the hand or foot lever.

Disadvantages in known parking brakes are their relatively large spatial requirements and their associated great weight. The use of cables also requires relatively complicated mechanisms. In addition, the cables might tear or stretch, so that operational safety is not always guaranteed.

Parking brakes without cables are described in U.S. Pat. No. 6,997,294 B2, European patent application Publication EP 2 532 915 A1, U.S. Pat. No. 6,305,506 B1, and German published patent application DE 10 2012 020 765 A1. These parking brakes also have a relatively great inherent weight and feature a relatively complex design that takes up space.

BRIEF SUMMARY OF THE INVENTION

An object of the present invention is therefore to provide a parking brake, in particular for a vehicle, which has a compact, weight-reducing, and simple-to-manufacture design and also provides increased operational safety.

This object is solved with the features described and claimed herein. Advantageous embodiments are also described below and in the dependent claims.

According to one embodiment of the invention, the parking brake comprises a brake piston supported to be movable along a longitudinal axis between a braking position and an open position and by which a brake disk can be immobilized by applying a braking force when the brake piston is in the braking position, a drive unit by which the brake piston is movable along the longitudinal axis between the braking position and the open position, a toggle lever device that interacts with the brake piston and comprises a toggle lever having at least a first leg and a second leg, wherein the first leg and the second leg are rotatably connected with a joint element and can be actuated by the drive unit, wherein the toggle lever device provides the braking force and applies it to the brake piston, and a support device that supports the toggle lever device for providing the braking force.

A first force by which the toggle lever device is deflected has the effect that the toggle lever device provides a second force that is significantly larger than the first force. The toggle lever device consequently has the effect of increasing the force. In the embodiment described here, the drive unit only has to be dimensioned so that a displacement force provided by it is great enough to deflect the toggle lever device so far that the toggle lever device applies the necessary braking force. In addition, the displacement force must be large enough to move the brake piston between the braking position in which the brake piston contacts the object and the open position in which the brake piston is arranged at a distance from the object. Accordingly, the drive unit can have relatively small dimensions, because it must provide only the displacement force, but not the typically significantly larger braking force. Furthermore, the toggle lever device must be able to support, in order to be able to apply the braking force onto the brake piston. Here the support device which, in the simplest case, can be a stop independent of the brake piston, can also have a space-saving design. Consequently, the parking brake as a whole can have a very compact and thus space-saving design, whereby weight can be saved. The toggle lever device itself also requires only a very small installation space and is also simple to manufacture.

The toggle lever device comprises a toggle lever having at least one first leg and one second leg, wherein the first leg and the second leg are rotatably connected with a joint element. For providing the necessary braking force it is sufficient if the toggle lever has two legs, which is possible with a structurally simple design. The magnitude of the applied braking force therefore determines how far the toggle lever is extended. The more the two legs approach a parallel profile, the greater becomes the braking force applied by the toggle lever device. In this respect, the magnitude of the braking force can be determined by the deflection of the joint element, for which a significantly smaller force is necessary in comparison with the braking force.

In another embodiment the brake piston can enclose a hollow space, and the drive unit, the toggle lever device, and/or the support device are arranged completely or partially in the hollow space. In many cases, the brake piston has an elongated, cylinder-like shape, which is well suited to enclosing a hollow space, in which at least parts of the drive unit, the toggle lever device, and/or the support device can be arranged. In this way, on one hand installation space is saved, so that the parking brake can have an even more compact design, and on the other hand the components arranged in the hollow space are protected from external influences, such as dust, stone impact, and moisture, which leads to increased reliability.

Another embodiment distinguishes itself in that the support device comprises a wedge arrangement, which becomes wedged with the support device for supporting the toggle lever device. In addition to a relatively simple design, a wedge arrangement has the advantage that it can be designed so that it only blocks when the toggle lever arrangement provides the braking force for applying a support force directed opposite the braking force. If no braking force is needed, the wedge arrangement can be shifted within the parking brake, in particular along the longitudinal axis. Compared with a stationary stop, here the advantage is achieved that a change in dimensions of the brake piston caused by wear can be compensated by a corresponding shifting of the wedge arrangement, so that the required braking force is provided independent of the wear. Despite the ability of the wedge arrangement to shift, very high support forces and thus very high braking forces can be provided.

Furthermore, the wedge arrangement can comprise a clamping wedge, which is actively connected to the toggle lever device. The clamping wedge can engage in an inclined recess matching the clamping wedge, whereby, in a structurally simple way, a high support force directed against the braking force can be provided.

According to a more refined embodiment, the wedge arrangement comprises a clamping ring, which can be shifted by the drive unit along the longitudinal axis and which interacts with the clamping wedge. Therefore, because the clamping ring can be shifted by the drive unit along the longitudinal axis, the support location of the wedge arrangement can be changed by the drive unit, for example to compensate the change in dimensions of the brake piston. In addition, the braking force can be provided selectively and removed again by a corresponding control of the drive unit.

In another embodiment, the support device comprises a support sleeve movable relative to the brake piston along the longitudinal axis, on which the wedge arrangement is supported. The support sleeve can also be arranged in the hollow space, whereby space can be saved. It must be possible for the wedge arrangement to be supported on an object that is independent of the brake piston. The support sleeve itself can be supported, for example, on a carrier of the vehicle body or on a housing surrounding the parking brake. Within the support sleeve the wedge arrangement can be supported at any location, so that the ability to compensate the change in dimensions described above can be realized in a simple way.

In one more refined embodiment the drive device has a spindle and a nut that is movable on the spindle along the longitudinal axis, wherein the nut comprises an actuation section for deflecting the joint element. In this embodiment, cables can be eliminated, which is advantageous in that deflection mechanisms are no longer needed for the cables. In addition, there is no longer the risk that the cables will tear. The actuation section can here have, for example, an inclined plane that comes in contact with the joint element or an actuation surface of the toggle lever. If the nut moves along the longitudinal axis, then the joint element is deflected radially outward, whereby the toggle lever is extended and consequently the braking force is provided. As already mentioned, the magnitude of the braking force determines how far the toggle lever is extended. In this respect, the braking force can be set with the position of the nut on the spindle. Because the forced for the radial deflection of the joint element is relatively small compared with the braking force generated by the toggle lever, the spindle can have relatively small dimensions in comparison with solutions in which the spindle must apply the braking force. Complicated transmissions for increasing the force are not necessary. The spindle itself is also then as good as load free, when the toggle lever device applies the maximum braking force.

It is possible that the clamping ring is movable with the nut along the longitudinal axis. The clamping ring can engage around the spindle and be designed so that it is movable on it along the longitudinal axis. In this case, the drive unit can have a relatively simple design, because no additional part is needed for moving the clamping ring. The clamping ring is carried along by the nut.

According to another embodiment of the parking brake, the clamping ring is connected to the nut by an extension element. When the clamping ring has a clamping interaction with the clamping wedge, it can no longer move along the spindle. When the clamping ring is connected rigidly to the nut, the nut can also no longer be moved further along the longitudinal axis. If the clamping ring is connected to the nut by the extension element, the clamping ring is carried along until it has a clamping interaction with the clamping wedge.

The nut, however, can be moved further along the spindle in order to extend the toggle lever farther, whereby the braking force can be set for clamping independent of the position of the clamping ring.

An embodiment of the invention relates to an immobilizing device, in particular for immobilizing a vehicle, comprising a brake disk that is locked in rotation with a wheel of the vehicle, and a parking brake according to one of the foregoing embodiments. The advantages and technical effects, which can be achieved with this embodiment of the immobilizing device, correspond to those that have been discussed for the relevant embodiments of the parking brake. In summary, at this point the ability should be mentioned of designing the parking brake and consequently also the immobilizing device with a space-saving and weight-saving construction and manufacturing it in a simple way. In addition, the parking brake and consequently the immobilizing device can operate with a high operational reliability.

In another embodiment the brake piston and/or the brake disk has a friction lining. The use of a friction lining makes it possible to provide a high braking effect. It is also achieved that the friction lining and not the brake piston and/or the object is subject to wear during the operation of the immobilizing device, so that the brake piston and/or the object are not damaged.

One construction of the invention relates to a vehicle having a parking brake according to one of the previously explained embodiments and/or an immobilizing device according to one of the embodiments described above. The advantages and technical effects that can be achieved with this construction of the vehicle correspond to those that have been discussed for the relevant embodiments of the parking brake. In summary, at this point the ability should be mentioned of designing the parking brake and consequently also the immobilizing device with a space-saving and weight-saving construction and manufacturing it in a simple way. In particular, due to the reduced weight, the vehicle can be operated in a fuel-saving way and can be driven dynamically.

Another construction of the invention relates to a method for immobilizing a vehicle having an immobilizing device according to one of the previously described embodiments, comprising the following steps:

Shifting a brake piston, supported to be movable along a longitudinal axis between a braking position and an open position, into the braking position by a drive unit, Actuating a toggle lever device interacting with the brake piston by the drive unit, whereby the toggle lever device provides the braking force and applies it onto the brake piston, wherein the toggle lever device for providing the braking force is supported on a support device.

The advantages and technical effects, which can be achieved with this construction of the method, correspond to those that have been discussed for the relevant embodiments of the parking brake. In summary, at this point the ability should be mentioned of designing the parking brake and consequently also the immobilizing device with a space-saving and weight-saving construction and manufacturing it in a simple way.

BRIEF DESCRIPTION OF THE DRAWINGS

Exemplary embodiments of the invention are explained in more detail below with reference to the accompanying drawings. Shown are:

FIGS. 3(a) to 3(f) is a series of basic diagrams of an immobilizing device for explaining the functioning of the parking brake and the immobilizing device.

DETAILED DESCRIPTION OF THE INVENTION

Figure 1:
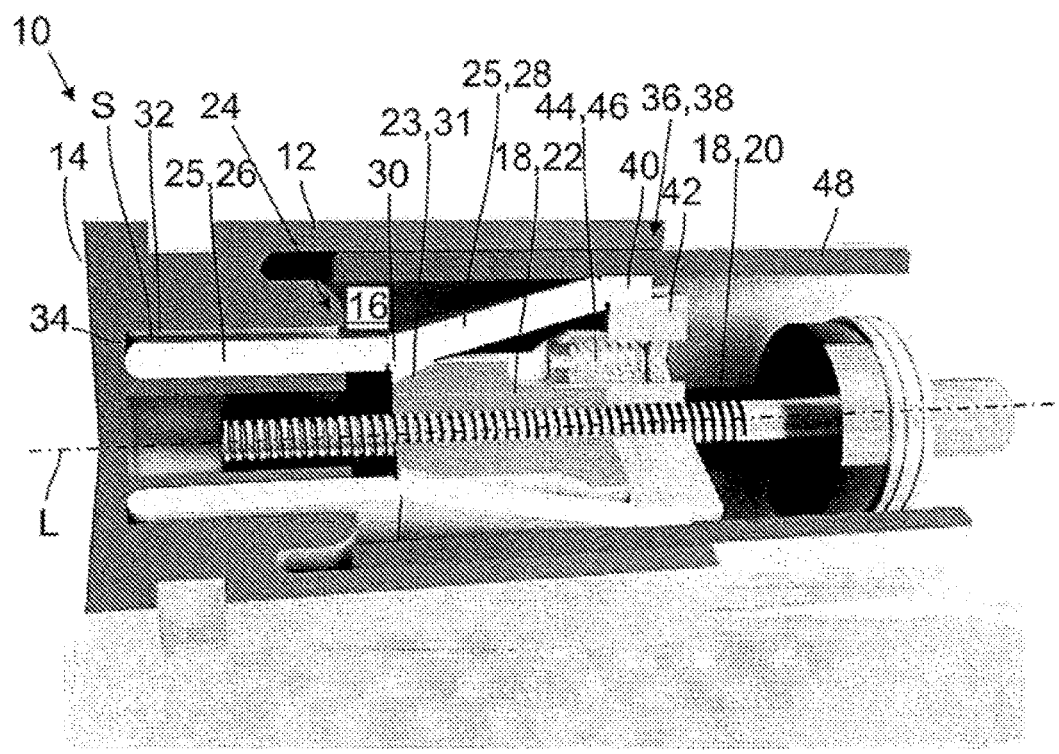
FIG. 1 is a perspective view of one embodiment of a parking brake according to the invention.
Figure 2:
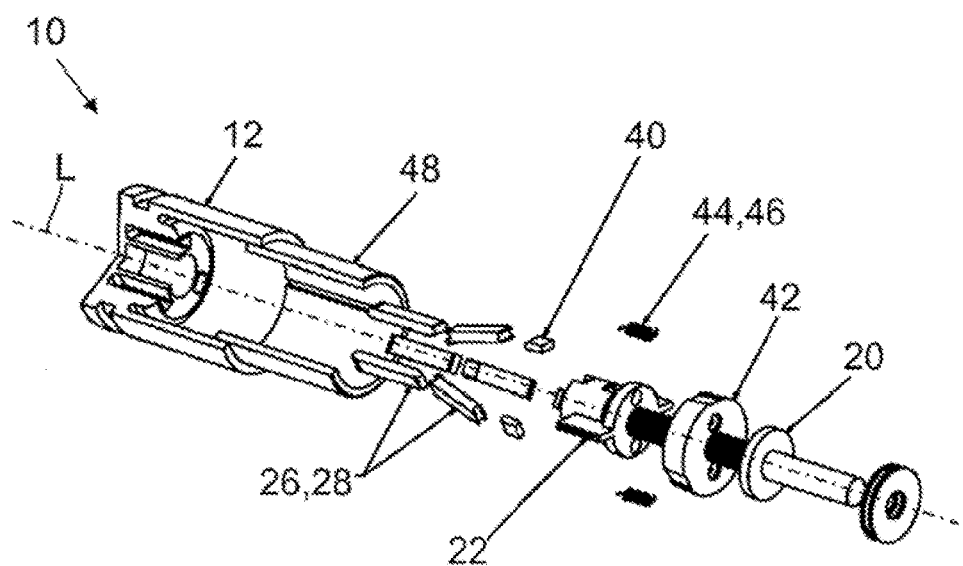
FIG. 2 is an exploded view of the embodiment of the parking brake shown in FIG. 1.

The embodiment shown in FIGS. 1 and 2 of a parking brake 10 according to the invention comprises a brake piston 12, which has an essentially tubular shape having a closed front surface 14 and encloses a hollow space 16 that defines a longitudinal axis L. The parking brake 10 further has a drive unit 18, which comprises a spindle 20 that runs coaxial to the longitudinal axis L and extends into the hollow space 16. The spindle 20 can be driven with a motor (not shown), which likewise can be arranged coaxial to the longitudinal axis L or else in an axis-parallel arrangement. The drive unit 18 also has a nut 22 movable forward and back with the spindle 20 along the longitudinal axis L by rotating the spindle 20 along the longitudinal axis L. The nut 22 has an actuation section 23, which has a conical shape in the shown embodiment.

In addition, the parking brake 10 comprises a toggle lever device 24 arranged in the hollow space 16 and having in the shown embodiment a total of three toggle levers 25 arranged about the longitudinal axis L, each having a first leg 26 and a second leg 28. The first leg 26 and the second leg 28 are connected to each other with a joint element 30, so that they can rotate about an axis lying in a plane running perpendicular to the longitudinal axis L. The joint element 30 is here constructed such that one of the two legs 26, 28 has a groove-shaped recess in which a correspondingly shaped extension of the other leg 26, 28 engages rotatably. In the shown embodiment, the second leg 28 has an actuation surface 31 in contact with the actuation section 23 of the nut 22. The first leg 26 is here supported so that it is movable in a recess 32 formed by the brake piston 12 along the longitudinal axis L, wherein the recess 32 has a closed end 34 pointing toward the front surface 14. In the state shown in FIG. 1, the first leg 26 runs essentially parallel to the longitudinal axis L and does not completely fill the recess 32 in the radial direction with respect to the longitudinal axis L. The first leg 26 contacts the recess 32 in the radially inward direction, while a gap S is present in the radially outward direction between the first leg 26 and the recess 32.

The second leg 28 interacts with a support device 36 arranged at least partially in the hollow space 16. The support device 36 comprises a wedge arrangement 38 comprising a clamping wedge 40 actively connected to the second leg 28. In the shown embodiment the active connection is realized in that the second leg 28 has, on its free end, a groove-shaped recess that interacts with a correspondingly shaped extension of the clamping wedge 40, such that the second leg 28 is connected to the clamping wedge 40 so that it can rotate about an axis, which lies in an axis running perpendicular to the longitudinal axis L. The clamping wedge 40 is supported radially inward on a clamping ring 42, which surrounds the spindle 20 and can be shifted with the nut 22 along the longitudinal axis L. In contrast to the nut 22, the clamping ring 42 has no thread interacting with the spindle 20, but instead can slide along on the thread of the spindle 20. The clamping ring 42 is connected to the nut 22 by an extension element 44, which is constructed in the shown example as a spring 46.

Radially on the outside, the clamping wedge 40 is supported on a support sleeve 48, which is arranged at least partially in the hollow space 16 and is supported in the brake piston 12 to be movable relative to the brake piston 12 along the longitudinal axis L. Here, the support sleeve 48 is pushed in a telescoping fashion into the hollow space 16 of the brake piston.

In FIGS. 3(a) to 3(f), for illustrating the function, an immobilizing device 50, which comprises a parking brake 10 having the described design, is shown using a basic diagram. In FIG. 3(a), the brake piston 12 is in an open position in which it is arranged at a distance from a friction lining 52. The friction lining 52 is deposited on a brake disk 54, which is connected locked in rotation with a wheel (not shown) of a vehicle (likewise not shown). The first leg 26 of the toggle lever 25 is arranged at a distance from the closed end 34 of the recess 32, which is shown symbolically by the distance between the first leg 26 and the brake piston 12. By rotating the spindle 20, the nut 22 is shifted in the direction shown by the arrow P in FIG. 3(b) along the longitudinal axis L toward the friction lining 52. Because the nut 22 is connected by the extension element 44 to the clamping ring 42, the clamping ring 42 follows the motion of the nut 22. The clamping ring 42 shifts the clamping wedge 40 also toward the friction lining 52, whereby the clamping wedge 40 slides along on the inside of the support sleeve 48. The support sleeve 48 itself is not moved at the same time. The clamping wedge 40 also pushes the toggle lever 25 into the friction lining 52 until the first leg 26 contacts the closed end 34 of the recess 32 (see FIGS. 1 and 3(b)). If the spindle 20 is rotated further, the toggle lever 25 pushes the brake piston 12 forward until it contacts the friction lining 52 (see FIG. 3(c)) and the braking position has been reached. If the spindle 20 is rotated further and the nut 22 moves farther toward the friction lining 52, the toggle lever 25 can no longer move the brake piston 12 toward the friction lining 52. The actuation section 23 of the nut 22 pushes the joint element 30 radially outward, wherein the actuation section 23 slides along on the actuation surface 31 of the second leg. The angle enclosed by the first leg 26 and by the second leg 28 is increased, which extends the toggle lever 25. The first leg 26 can rotate due to the gap S in the recess 32 and then no longer runs parallel to the longitudinal axis L. Due to the extension of the toggle lever 25, the clamping wedge 40 is shifted somewhat away from the friction lining 52, so that it is wedged between the clamping ring 42 and the support sleeve 48. As soon as the clamping wedge 40 becomes wedged, the position of the clamping wedge 40 and the clamping ring 42 is fixed. If the nut 22 is shifted further toward the friction lining 52, the nut 22 and the clamping ring 42 move away from each other and the extension element 44 is extended (see FIG. 3(d)). If the toggle lever 25 is extended farther, the brake piston 12 is pressed more strongly against the friction lining 52 and the brake disk 54 due to the increase in its extent with respect to the longitudinal axis L, whereby a braking force is established on the friction lining 52 and the brake disk 54. The farther the toggle lever 25 is extended, the stronger the braking force becomes. Consequently, the brake disk 54 and thus the wheel can no longer rotate, so that the vehicle is now immobilized.

When the vehicle is to be moved, the spindle 20 is rotated in the opposite direction, so that the nut 22 is moved away from the friction lining 52. The toggle lever 25 becomes shorter again, so that the braking three is decreased. The nut 22 comes back in contact with the clamping ring 42 and pushes it away from the friction lining 52, so that the wedging of the clamping wedge 40 is stopped. Now a braking force is no longer applied to the friction lining 52 (FIG. 3(e)). If the nut 22 is moved further away from the friction lining 52, the toggle lever 25 is also moved away from the friction lining 52, for which carriers or stops (not shown) can be provided. The first leg 26 then no longer contacts the closed end 34 of the recess 32. The stops can be constructed such that the nut 22 also moves the brake piston 12 away from the friction lining 52, in order to set the brake piston back into the open position and prevent the brake piston 12 from grinding on the friction lining 52. Alternatively, restoring springs (not shown) can be provided.

Therefore, because the wedge arrangement 38 is blocked only when the toggle lever device 24 can no longer push the brake piston 12 against the friction lining 52, the wear of the friction lining 52 is automatically compensated. In addition, the spindle 20 is load-free when the braking force is applied, so that it cannot be damaged or blocked by the braking force.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A parking brake comprising:
   a brake piston supported to be movable along a longitudinal axis between a braking position and an open position and by which a brake disk is immobilizable by applying a braking force when the brake piston is in the braking position,
   a drive unit by which the brake piston is movable along the longitudinal axis between the braking position and the open position,
   a toggle lever assembly that interacts with the brake piston and comprises a toggle lever having at least one first leg and a second leg, wherein the at least one first leg and the second leg are connected rotatably with a joint element and are actuatable by the drive unit, wherein the toggle lever assembly provides the braking force and applies it to the brake piston,
   a support which supports the toggle lever assembly for providing the braking force, a wedge arrangement that wedges together with the support for supporting the toggle lever assembly, and
   the wedge arrangement comprising a clamping wedge, which is actively connected to the toggle lever assembly.

2. The parking brake according to claim 1, wherein the brake piston encloses a hollow space, and at least one of the drive unit, the toggle lever assembly, and/or the support are arranged at least partially in the hollow space.

3. The parking brake according to claim 1, wherein the wedge arrangement further comprises a clamping ring, which is movable by the drive unit along the longitudinal axis and interacts with the clamping wedge.

4. The parking brake according to claim 3, wherein the support comprises a support sleeve, which is movable relative to the brake piston along the longitudinal axis and on which the wedge arrangement is supported.

5. The parking brake according to claim 3, wherein the drive device unit has a spindle and a nut movable on the spindle along the longitudinal axis, and wherein the nut comprises an actuation section to extend the joint element.

6. The parking brake according to claim 5, wherein the clamping ring is movable with the nut along the longitudinal axis.

7. The parking brake according to claim 6, wherein the clamping ring is connected to the nut by an extension element.

8. An Immobilizing device for immobilizing a vehicle, the device comprising:
   a brake disk which is locked in rotation to a wheel of the vehicle, and
   a parking brake according to claim 1.

9. The Immobilizing device according to claim 8, wherein at least one of the brake piston and the brake disk has a friction lining.

10. A vehicle having a parking brake according to claim 1.

11. A method for immobilizing a vehicle having an immobilizing device according to claim 8, the method comprising the following steps:
   a. moving the brake piston, supported to be movable along the longitudinal axis between the braking position and the open position, into the braking position by the drive unit; and
   b. actuating the toggle lever assembly that interacts with the brake piston by the drive unit, wherein the toggle lever assembly comprises the toggle lever having the at least one first leg and the second leg, wherein the at least one first leg and the second leg are connected rotatably with the joint element, and wherein the toggle lever assembly provides the braking force and applies the braking force to the brake piston, wherein the toggle lever assembly is supported on the support.

* * * * *